Figure 1:
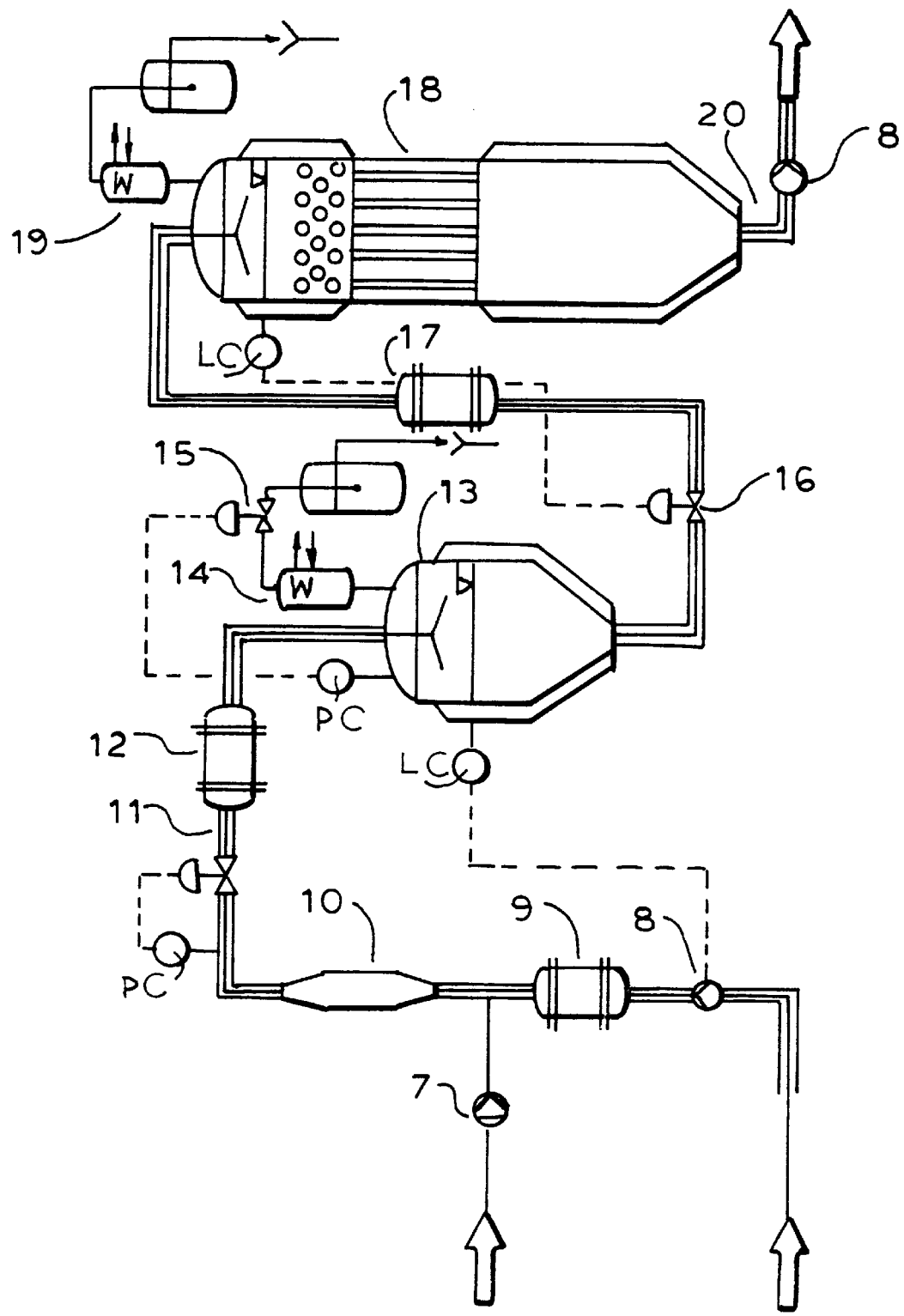

United States Patent [19]
Wiltzer et al.

[11] Patent Number: 5,962,538
[45] Date of Patent: Oct. 5, 1999

[54] METHOD OF CONTINUOUSLY PRODUCING POLYAMIDE 6 USING RECYCLED LACTAM

[75] Inventors: Karlheinz Wiltzer, Bad Blankenburg; Peter Lausmann, Rudolstadt; Baldur Ebert, Bad Blankenburg, all of Germany

[73] Assignee: Polymer Engineering GmbH, Germany

[21] Appl. No.: 09/029,526

[22] PCT Filed: Aug. 30, 1996

[86] PCT No.: PCT/EP96/03827

§ 371 Date: Feb. 27, 1998

§ 102(e) Date: Feb. 27, 1998

[87] PCT Pub. No.: WO97/08224

PCT Pub. Date: Mar. 16, 1997

[30] Foreign Application Priority Data

Aug. 30, 1995 [DE] Germany ............... 195 31 990

[51] Int. Cl.$^6$ ............... C08J 11/04; C08G 69/14
[52] U.S. Cl. ............... 521/48; 523/343; 528/323; 528/499; 210/808
[58] Field of Search ............... 521/48; 528/323, 528/499; 523/343

[56] References Cited

U.S. PATENT DOCUMENTS

| | | | |
|---|---|---|---|
| 4,053,457 | 10/1977 | Cordes et al. | 528/323 |
| 4,327,208 | 4/1982 | Lehr et al. | 528/323 |
| 4,376,680 | 3/1983 | Horak et al. | 528/310 |
| 5,646,191 | 7/1997 | Wiltzer et al. | |

FOREIGN PATENT DOCUMENTS

| | | |
|---|---|---|
| 0000397 | 1/1979 | European Pat. Off. . |
| 0005466 | 11/1979 | European Pat. Off. . |
| 0123881 | 11/1984 | European Pat. Off. . |
| 2501348 | 7/1976 | Germany . |
| 2948865 | 6/1980 | Germany . |
| 4324616 | 1/1995 | Germany . |

*Primary Examiner*—Tae Yoon
*Attorney, Agent, or Firm*—Ostrolenk, Faber, Gerb & Soffen, LLP

[57] ABSTRACT

The invention concerns a method of continuously producing polyamide 6 using recycled lactam from extraction and melt-demonomerizing stages. According to the invention, the cyclic oligomers present in the recycled lactam owing to the addition of ε-caprolactam (fresh lactam) are dissolved in the lactam as a function of the concentration of the oligomers in the product in use, at a dissolution temperature of between 120° C. and 180° C. The solution is then passed to a treatment, the solution preferably being introduced into a closed system and hydrolyzed in the fusible phase under pressure, at water contents of between 3 and 15% and temperatures ranging from 220 to 280° C. With a constant low water content being set, the melt is then fed to the polymerization process in a further pressure stage incorporating a gas chamber (polymerizator).

12 Claims, 2 Drawing Sheets

METHOD OF CONTINUOUSLY PRODUCING POLYAMIDE 6 USING RECYCLED LACTAM

The invention relates to a multistage method of continuously producing a polyamide 6 using recycled (returned) lactam which is obtained in extraction stages and melt demonomerization stages for reducing the low molecular mass fraction in polyamide 6.

It is known that the polycondensation of $\epsilon$-capro-lactam to polyamide 6 is accompanied by the establishment of a chemical equilibrium which is dependent on temperature. At a customary plant reaction temperature of 280° C., a water-soluble fraction of approximately 13% becomes established.

For the further processing of the polymer, it is necessary to remove the unreacted fraction. Various techniques are known for this purpose. For example, granules are produced from the melt at equilibrium, and these granules are extracted with water. This removes $\epsilon$-caprolactam, oligomers and dimers. This technique necessitates subsequent drying of the granules and working up of the aqueous extraction waters by evaporative concentration.

Also known are techniques where unreacted $\epsilon$-caprolactam, dimers and oligomers are driven off from melt films by means of vacuum or inert gas.

For economic reasons, these recovered products should be returned to the polymerization process.

There are techniques in which PA 6 extract water concentrates with high or low solids contents are added in lesser or greater proportions to the fresh lactam so that they too can be converted to polyamide 6. In accordance with DE-B 25 01 348 and DE-A 27 32 328, polyamide 6 extract waters concentrated to a solids content of more than 90% and, respectively, to a solids content of 60–70% are polymerized, together with more than the equal amount of fresh lactam based on the solids content, with propionic and, respectively, benzoic acid in a reactor which is operated essentially at atmospheric pressure.

A disadvantage of this technique is that when polymerizing polyamide 6 extract water concentrates with monocarboxylic acids, the polymerization times required are longer than when polymerizing fresh lactam with monocarboxylic acid. The conversions of $\epsilon$-caprolactam and of cyclic oligomers obtained, moreover, are approximately 2 to 3% below those of fresh lactam polymers, since the cyclic oligomers play essentially no part in the reaction mechanism. The high water content in the reaction mixture, in conjunction with the unpressurized operation of the polymerization reactor, leads to an unfavorable reaction course. The water is unable to act in the reaction since it evaporates.

It is additionally known that melt vacuum demonomerization processes are operated such that the demonomerization products drawn off in gas form, i.e. $\epsilon$-caprolactam and cyclic oligomers, are condensed in fresh lactam and so also subjected to the polymerization (DE-A 28 21 886 and DE-A 29 48 865). In the case of similar processes as well, the cyclic oligomers, and especially the cyclic dimers, are not transformed into reactive compounds.

Also known is the strong catalytic effect of o-phosphoric acid on the polymerization of $\epsilon$-caprolactam [Geleji, F. et al. "Wirkungsmechanismus verschiedener Katalysatoren bei der Caprolactampolymerisation" [Mechanism of action of various catalysts in the polymerization of caprolactam] in Faserforschung und Textiltechnik 13 (1962)6, 282–283] in relation to the polymerization of cyclic oligomers (Schade, H. and Beckhaus, F. W.: Verfahren zum Polymerisieren von Oligomeren des $\epsilon$-Caprolactams [Process for polymerizing oligomers of $\epsilon$-caprolactam]—DD Patent 24 307). Disadvantages of such a polymerization technology are, inter alia:

- excessively rapid rise in viscosity and hence unsatisfactory reproducibility of the desired degree of polymerization, since the o-phosphoric acid acts essentially as catalyst and less as chain regulator
- inadequate conversions of $\epsilon$-caprolactam and cyclic oligomers, and
- depolymerization processes in the course of processing of polyamide 6 granules of this type.

In order to circumvent these above-mentioned problems, it is common when reprocessing the aqueous extraction waters to separate off the oligomers by distillation. The oligomers separated off are landfilled, which pollutes the environment, or else subjected to energy-intensive depolymerization to give lactam, by processing with phosphoric acid, and the lactam is subsequently passed to a purification stage. The residues are landfilled.

For technical reasons and on grounds of economy, polyamide producers have to date concentrated the lactam/oligomer mixture by evaporative concentration to a residual water content of $\leq 2\%$. At this water content, it becomes impossible to bind the cyclic dimer chemically into the polymer structure.

The aim of the invention is to ensure reliable and continuous processing in the course of the production of polyamide 6 using recycled lactam and, in particular, to bind cyclic dimers and cyclic oligomers which have been introduced by way of recycled lactam into the production process and to process the entire amount into high-grade end products in a closed circuit of materials (without waste).

The object of the invention is to dissolve oligomers present in the recycled lactam in the lactam and to hinder the formation of the cyclic dimer in the course of the polymerization and to convert, in a simple manner, cyclic dimers of the lactam/oligomer mixture which are present at the same time from recycled lactam into a reactive compound and to allow them to take part in the production process.

This object is achieved by virtue of the features described. Advantageous embodiments and developments of the invention are also described.

In accordance with the invention, when using recycled lactam with the addition of $\epsilon$-caprolactam (fresh lactam), further processing is preceded by the cyclic oligomers present in the recycled lactam being dissolved in the lactam. In this case, depending on the initial concentration of the oligomers in the feedstock, a solution temperature of the oligomers in the lactam of between 120 and 180° C. is established.

For this purpose, for example, the recycled lactam is conveyed from a recycled lactam container by means of a heated pump, is heated by a heat exchanger to preferably 150° C. and is circulated and/or passed to a further operation.

In the case of the production of polyamide 6 in accordance with the invention, using recycled lactams, the further processing of the recycled lactam takes place with oligomers dissolved in the lactam, the recycled lactam being introduced, with or without the addition of fresh lactam, preferably into a closed system and being treated under pressure in the liquid melt phase by hydrolysis at water contents of from 3 to 15% and at temperatures in the range of 220–280° C.

In the course of the hydrolysis of the cyclic oligomers, especially cyclic dimers, in the reaction mixture, the water content in this pressure stage (dimer treatment stage) is held preferably, in accordance with the water content of the recycled lactam, at from 6 to 15%.

Under the conditions of the above-mentioned establishment of water concentration and reaction temperature, the dimeric ring compound is cleaved open. In this case the cyclic dimer produces aminocaproic acid and linear dimers, which allow trouble-free insertion into a polymer chain.

It has surprisingly been found that about 3% of water must be present in the lactam/oligomer mixture in order to cleave the cyclic dimer, the water fraction making a favorable and fully effective contribution to the reaction under elevated pressure in a closed system. With such a solution, it is possible to employ fresh lactam and recycled lactam and also recycled lactam, without problems, alone.

The water content of the polymer melt is subsequently adjusted in a further pressure stage with gas space (polymerizer), by taking off the excess water, as a function of the desired constant degree of final polymerization, to from 0.3 to 1.9%. For this purpose, the pressure in the gas space of this polymerizer is regulated, preferably by regulating the water content and/or the temperature.

The invention will be illustrated by exemplary embodiments:

FIG. 1 shows diagrammatically the treatment of the cyclic dimers and the subsequent course of the polymerization reaction.

Figure 2:
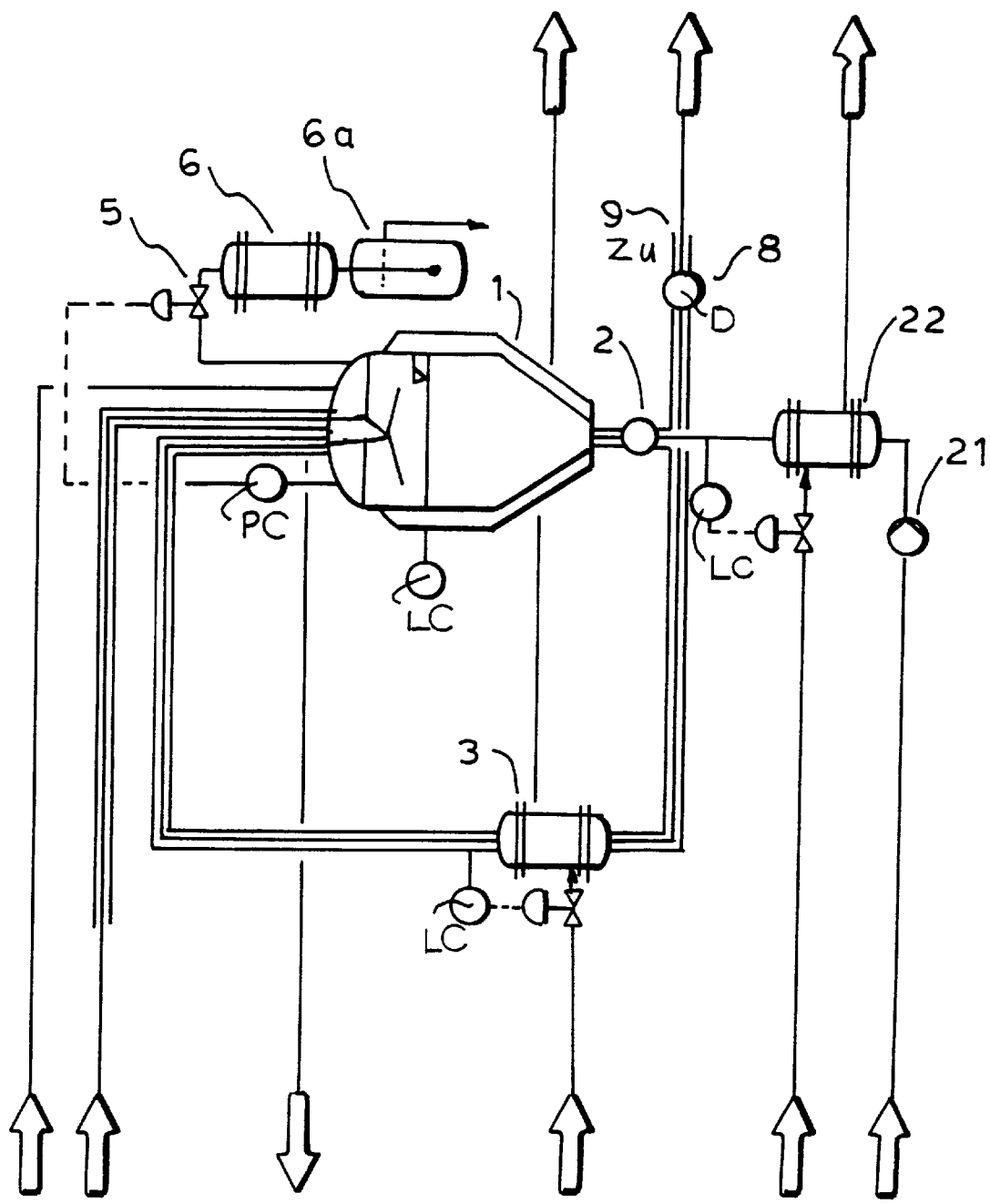

In accordance with the sequence depicted in FIG. 2, undissolved dimers and oligomers present in recycled lactam are dissolved in the lactam.

EXEMPLARY EMBODIMENT 1

For the production of polyamide 6 from recycled lactam, extraction waters are concentrated to a mean solids content of 93% (long-term fluctuation range 91 to 95%). This so-called recycled lactam consists of monomeric lactam, dimers, oligomers and water. When collected in a recycled lactam container, dimers and oligomers are not sufficiently dissolved.

By means of the heated pump 2, the recycled lactam is heated to 150° C. by a heat exchanger 3 and is conveyed in circulation. At the mixing temperature which is established in the recycled lactam container, all dimers and oligomers are dissolved. To establish a water content >3%, in this example between 5 and 9%, the pressure-limited regulator valve 5 is employed. Any water which evaporates is condensed and taken off. Water is able to evaporate when the water content in the crude lactam is >9%. By means of a metering pump 8, the recycled lactam is pressed into the dimer treatment stage 10 by way of a further heat exchanger 9.

In this heat exchanger 9, the recycled lactam is heated to at least 220° C. The dimer treatment stage 10 comprises a jacketed pressure apparatus which is filled with product with no gas phase—and is actively insulated through the jacket by means of heat transfer media.

Under these conditions, a polyamide melt having a relative solution viscosity of from 1.25 to 1.35 (solution viscosity based on polymer/sulfuric acid solution with 1 g of polyamide in 100 ml of 96% strength acid in comparison to pure 96% strength sulfuric acid) is obtained after the dimer treatment stage.

In order to be able to produce a polymer having constant and relatively high viscosities, the physically dissolved water which is present in excess must be driven off from the melt in a polymerizer down to a required water content which is dependent on the desired end viscosity.

A valve 11 ensures that the pressure remains set at above the boiling point of the product in the dimer treatment stage 10. By way of an evaporator 12, the product passes into the polymerizer 13, which is operated under pressure at a water concentration of 1.7%. The evaporated water leaves the system via a reflux column, from which the lactam present in the ascending steam runs back into the polymerizer 13 again.

After the polymerizer 13, the polyamide passes via valve and evaporator into a polyamide post-condenser 18. In the bottom part of this post-condenser 18 the PA melt is cooled to 240° C.

Via a metering pump 20, the polyamide leaves the process with a solution viscosity of 2.5 and a water-extractable fraction of 9.9%.

EXEMPLARY EMBODIMENT 2

In a polymerization plant for the production of polyamide 6, a lactam/oligomer mixture is employed which originates from demonomerization stages and accordingly contains virtually no water.

In order to prevent precipitation of the oligomers, this mixture is heated by means of heat exchanger 3 to 150° C., as a result of which the dimers and oligomers dissolve. This solution can be transported without problems over relatively large distances without any blocking of the pipelines as a result of precipitated oligomers.

The lactam/dimer/oligomer solution is heated as in Exemplary Embodiment 1 in a further heat exchanger 9, but in this case to not less than 240° C., and is then introduced into the pressure stage of the invention, the dimer treatment stage 10, where it is treated. Between heat exchanger and dimer treatment stage, water is fed in by way of the valve 7 and the melt is adjusted to a water content of 6% of physically dissolved water. The cyclic oligomers, and especially dimers, are reactively cleaved in the pressure stage by hydrolysis.

The subsequent course of polymerization is as described in Exemplary Embodiment 1. The resulting polymer has a solution viscosity of 2.52 and an overall extractables content of 9.9%.

EXEMPLARY EMBODIMENT 3

In a polymerization plant, polyamide 6 is produced from recycled lactam and fresh lactam.

For this purpose the lactam/oligomer mixture, which is recovered from demonomerization stages, is admixed with an approximately equal amount of fresh lactam. In these mixing proportions, the oligomers dissolve in the lactam already at about 120° C. Heating and further treatment of the polymeric melt are performed as described in Exemplary Embodiment 1. The infeed of water to a water content of 6% takes place as set out in Exemplary Embodiment 2. The resulting polymer has a solution viscosity of 2.61 and an overall extractables content of 9.7%.

We claim:

1. A method of continuously producing polyamide 6 using recycled lactam from extraction stages and melt demonomerization stages, which comprises dissolving the cyclic oligomers present in the recycled lactam, with the addition of ε-caprolactam (fresh lactam), in the lactam as a function of the concentration of the oligomers in the feedstock and at a solution temperature of between 120 and 180° C. and then passing the solution to a treatment stage in which the solution is introduced into a system and is treated in the liquid melt phase in a first pressure stage by hydrolysis at water contents of from 3 to 15% and at temperatures in the range from 220 to 280° C.

and the liquid melt phase is subsequently passed to the subsequent polymerization process with establishment of a constant lower water content in a further pressure stage with gas space.

2. The method as claimed in claim 1, wherein recycled lactam is conveyed by means of a heated pump from a recycled lactam container and is heated by a heat exchanger and is circulated.

3. The method as claimed in claim 1, wherein the water content in the liquid melt phase in the course of the hydrolysis of the cyclic oligomers and dimers in the pressure stage is held, in accordance with the prevailing water content of the recycled lactam, at from 6–15%.

4. The method as claimed in claim 1, wherein the water content in the polymeric melt is adjusted in the further pressure stage with gas space, as a function of the desired degree of final polymerization, at from 0.3–1.9% by taking off the excess water.

5. The method as claimed in claim 4, wherein the water content in the liquid melt phase in the course of the hydrolysis of the cyclic oligomers and dimers in the pressure stage is held, in accordance with the prevailing water content of the recycled lactam, at from 6–15%.

6. The method as claimed in claim 5, wherein recycled lactam is conveyed by means of a heated pump from a recycled lactam container and is heated by a heat exchanger.

7. The method as claimed in claim 6 in which the solution is introduced into a closed system first pressure stage.

8. The method as claimed in claim 6 in which the recycled lactam is heated by the heat exchanger to 150° C.

9. The method as claimed in claim 2, wherein the water content in the liquid melt phase in the course of the hydrolysis of the cyclic oligomers and dimers in the pressure stage is held, in accordance with the prevailing water content of the recycled lactam, at from 6–15%.

10. The method as claimed in claim 9 in which the recycled lactam is heated by the heat exchanger to 150° C.

11. The method as claimed in claim 2 in which the recycled lactam is heated by the heat exchanger to 150° C.

12. The method as claimed in claim 1 in which the solution is introduced into a closed system first pressure stage.

* * * * *